United States Patent [19]  [11]  4,394,477
Screeton  [45]  Jul. 19, 1983

[54] COATING COMPOSITION

[76] Inventor: James B. Screeton, Heathfield House, Lynstead, Nr. Sittingbourne, Kent, England

[21] Appl. No.: 316,358

[22] Filed: Oct. 29, 1981

[30] Foreign Application Priority Data

Oct. 30, 1980 [GB] United Kingdom ................. 8034934

[51] Int. Cl.³ .............................................. C08K 5/09
[52] U.S. Cl. .................................... 524/319; 523/122; 428/489
[58] Field of Search ........................ 524/319; 523/122; 428/489

[56] References Cited

FOREIGN PATENT DOCUMENTS 1512639  6/1978  United Kingdom .

Primary Examiner—Joseph L. Schofer
Assistant Examiner—N. Sarafin
Attorney, Agent, or Firm—Frost & Jacobs

[57] ABSTRACT

A composition for coating surfaces (especially bituminous surfaces) in order to render them reflective to visible and u/v light comprises in an alcoholic base a white mineral pigment, a laminar solid and a copolymer of vinyl acetate with either vinyl veo va or vinyl laureate. The composition preferably comprises a minor proportion of anatase titanium dioxide and an alcohol-soluble algicide.

8 Claims, No Drawings

COATING COMPOSITION

The present invention relates to a coating composition, particularly suitable for application to a surface for the purpose of protecting the surface of what lies beneath it or behind it, from the effect of excessive exposure to the rays of the sun, such as a tendency to overheat.

The composition is especially useful in the coating of roofs of buildings, where the existing roof cover is inadequate to withstand strong or persistent sunshine. Such roof cover may, for instance, comprise an exterior layer of a bituminous nature, such as asphalt, bitumen and/or mineral felts or bitumen/polymer sheeting. This type of cover tends to expand and soften under the sun's heat during the day and shrink on cooling at night.

Prior attempts to provide surface coating compositions for such a purpose have been less than satisfactory, being either in the form of emulsions which are sensitive to water and liable to breakdown under site conditions, or aluminium finishes which deteriorate rapidly from chemical contamination and so lose their reflectivity, or in the form of a two-component package which is inconvenient.

More recently, it has been proposed in British Patent Specification No. 1,512,639 to provide a coating composition suitable for bituminous surfaces comprising a pigment component dispersed in a binder component, wherein the pigment component contains in particulate form both a white mineral pigment and a laminar solid and the binder component substantially consists of a plasticised polymeric binder dissolved in an alcohol. The exemplified polymeric binder is a vinyl acetate/vinyl caprate copolymer. Unfortunately, such a copolymer can, to the Applicant's knowledge, only be prepared with the use of mercury catalysts. The use of mercury catalysts is undesirable, and is often now prohibited for health reasons.

It is an object of the present invention to provide an air-drying coating composition which forms a durable and highly reflecting coating when applied to a surface and thus protects the coated surface from the effects of excessive heat absorption but which can be prepared using an ecologically more acceptable catalyst.

According to the present invention I provide a coating composition comprising a pigment component dispersed in a binder component, wherein the pigment component contains in particulate form both a white mineral pigment and a laminar solid and the binder component substantially consists of a copolymer selected from a vinyl acetate veo va or a vinyl acetate laureate dissolved in an alcohol. A vinyl acetate laureate copolymer is preferred more especially where units derived from the vinyl acetate predominate.

These copolymeric binders of the invention possess distinct advantages over known copolymers. One advantage is that they can be produced without use of mercury catalysts. Furthermore, I have found, unexpectedly, that the nature of the polymeric binder employed in a coating composition is important in determining the emissivity of surfaces coated with the composition. The copolymeric binders of the present invention are particularly useful in that coating compositions comprising such binders possess great reflectivity within the ultraviolet (u/v) region of the solar spectrum. The absorbtion of u/v radiation is particularly damaging to bituminous surfaces by reason of its catalysing oxidative reactions which break down the components of the bitumen.

The binders of the present invention also possess a great degree of plasticity and resistance to shock whether caused by structural movement or surface temperture.

The binder preferably consists substantially of a copolymer comprising substantially 85% of units derived from vinyl acetate and 15% of units derived from vinyl laureate. Such a copolymer is available from Vinyl Products Ltd., Carshalton, England.

The copolymeric binder preferably constitutes 10 to 25 percent by weight of the composition. The function of the resin being to bind the pigment, and the viscosity and eventual film thickness being governed by the solvent, the proportions are chosen to produce a dry film thickness sufficient to exhibit a solid finish on a black substrate in two applications.

Suitable plasticisers which may be added to compositions of the present invention include dibutyl phthalate, which is preferred, dibutyl maleate, diamyl phthalate and dicapryl phthalate. In general the plasticiser is selected for compatibility with the binder resin and with the resin solvent, lack of toxicity and duration of effectiveness. The proportion of plasticiser is chosen according to the desired increase in film flexibility.

In relation to the use of the composition on bituminous substrates, ester plasticisers are most reliable because they do not tend to migrate into the bitumen. In this context the plasticiser must be soluble in alcohols which do not dissolve bitumen, which would exclude drying and non-drying vegetable oils, fats and stearates.

The particulate white mineral pigment is preferably rutile titanium dioxide (about 97 percent $TiO_2$) but others may be used, such as anatase titanium dioxide, zinc oxide or antimony oxide or mixtures of these. Aluminium could be used if the solvent is anhydrous.

It is particularly preferred that the pigment comprises a minor proportion of anatase titanium dioxide. For example, the pigment may comprise from 2 to 20%, preferably from 5 to 10% anatase titanium dioxide and from 80 to 98%, preferably from 90 to 95% rutile titanium dioxide. The presence of the anatase titanium dioxide causes the surface of the dried coating composition continuously to generate a fine dust. The dust, which represents only a minute quantity of the coating material, is continuously eroded by the elements. This process, which is known as chalking, helps to keep the coated surface clean (and hence more reflective) because a new surface is continuously being exposed. The pigment may be of the normal quality supplied to the paint industry and preferably present in the composition in a proportion of 15 to 30 percent by weight. Additional coloured pigment compatible with the rest of the composition may be included if desired. The white mineral pigment should preferably be such e.g. in respect of refractive index, so as to yield in a finished coating a relative reflectivity of at least 92 percent.

The particular laminar solid serves to diffuse the incident rays of the sun by virtue of the characteristic platelet form and the most favoured is mica in flake form. The platelet particles tend to overlap and form a barrier. Other materials which may be used include combinations of mica with chlorite and quartz (Plastorit), exfoliated vermiculite, talc and glass flake (Flakeglas, registered Trade Mark) or mixtures of these. The laminar solid is preferably employed in amounts from 4 to 7 percent by weight based on the composition.

The preferred composition may thus contain 20 to 35 weight percent of the pigment component comprising pigment and laminar solid.

The alcohol solvent selected must be a solvent for the copolymeric binder and should be nontoxic. Industrial alcohol containing 90 to 95 parts per 100 of ethanol, the other 5 to 10 parts being substantially all water, is favoured but certain other alcohols, for example isopropanol, may be used. The amount of solvent employed in the composition may for example be from 50 to 60 percent by weight of the composition. The copolymeric binder may be supplied in the form of a solution in the solvent containing for instance approximately 50 percent solids. In relation to use on a bituminous substrate, the solvent should not contain any hydrocarbon, aliphatic or aromatic, nor a halogenated solvent or ketone which may tend to dissolve bitumine.

The composition as a whole usefully has a viscosity measured with the No. 4 Ford cup at 25° C., of 51 to 65. It can have a measure of thixotropic behaviour as long as this does not intefere with flow on the substrate and wetting of the substrate. The most preferred ratio of pigment to binder on a solids basis lies between 1 part and 2 parts pigment to 1 part binder, giving high opacity and high reflectivity. The composition may be prepared, for example, by mixing the copolymeric binder, plasticiser and solvent, then adding the pigment component and laminar solid so that the pigments are rapidly wetted. Thorough dispersion and wetting of the pigments with the solvent medium is important. The pigment may advantageously be dispersed initially in only part of the prepared binder solution to form a concentrate which is subsequently diluted. It would be possible to supply such a concentrate as a paste to be diluted on site.

The compositions dry by solvent evaporation in air. They are most advantageously applied wherever the substrate is exposed to the sun. They can be used on dry and frost free horizontal vertical or sloping surfaces, applied in dry weather. They are readily applied by roller or airless spray, or in small areas by brush, preferably in two coats, to yield a fast drying, uniform layer of optimum reflectivity capable of rendering accommodation under the coated substrate significantly cooler.

The composition may also contain an algicide, which may also be a fungicide. Preferably, the algicide is soluble in alcohol, but only sparingly soluble or insoluble in water. This has the particular advantage that the algicide can be homogeneously distributed throughout the coating composition, a feature which is especially advantageous if the coating composition also contains anatase titanium dioxide. As mentioned above, the presence of anatase titanium dioxide causes the chalking effect by which the surface of the coating is continuously eroded on a microscopic scale. If the algicide is homogeneously distributed throughout the coating composition, the chalking effect causes fresh algicide to be exposed continuously over a prolonged period of time.

Preferably, the algicide is a chlorinated phenol, such as 5,5'-dichloro-2,2'-dihydroxy-diphenylmethane, which is available from British Drug Houses Ltd, Poole, England, under the Trade Mark "Panacide". Panacide is also a fungicide, and is of extremely low toxicity to higher organisms, including man.

The proportions of the components may be varied to suit particular or local conditions or substrates and the following Example is given for the purpose of illustrating the invention, the parts being by weight.

EXAMPLE

A composition is made by dispersing 157 parts of titanium white pigment (comprising 5% anatase, titanium dioxide) and 29 parts of mica flake by grinding them in a ball mill, in a resin solution previously prepared by dissolving 252 parts of vinyl acetate laureate (which contains approximately 50% resin solids dissolved in aqueous ethanol) in 266 further parts of aqueous ethanol and incorporating $6\frac{1}{4}$ parts of dibutyl phthalate as plasticiser and 7 parts of "Panacide" as fungicide. The vinyl acetate laureate copolymer comprises 15% of units derived from vinyl laureate and 85% of units derived from vinyl acetate. The aqueous alcohol contains about 90–95 percent industrial ethanol.

The composition is storable in sealed containers and dries in air to a water resistant film with excellent weathering and solar reflecting properties.

The compositions of the invention provide protection particularly against u/v catalysed oxidation effects on the substrate as well as against thermal effects. When asphalt, which is thermoplastic has been covered by treatment with the composition, it remains cooler than it otherwise would, and is therefore not so liable to be damaged or punctured by movement over the surface.

I claim:

1. A coating composition comprising a pigment component dispersed in a binder component, wherein the pigment component contains in particular form both a white mineral pigment and a laminar solid and the binder component substantially consists of a copolymer selected from a vinyl acetate veo va copolymer and a vinyl acetate laureate copolymer dissolved in an alcohol.

2. A coating composition according to claim 1 wherein the binder is a vinyl acetate laureate comprising a predominance of units derived from vinyl acetate.

3. A coating composition according to claim 2 wherein the binder is a vinyl acetate laureate copolymer comprising substantially 85% of units derived from vinyl acetate and 15% of units derived from vinyl laureate.

4. A coating composition according to claim 1 wherein the white mineral pigment comprises anatase titanium dioxide.

5. A coating composition according to claim 4 wherein the white mineral pigment comprises rutile and anatase titanium dioxide, the anatase titanium dioxide being present in an amount which is from 2 to 20% by weight of the total amount of titanium dioxide.

6. A coating composition according to claim 5 wherein the anatase titanium dioxide is present in an amount which is from 5 to 10% by weight of the total amount of titanium dioxide.

7. A coating composition according to claim 1 or 5 including an active component selected from the group comprising algicides and fungicides, which active component is soluble in the alcohol but substantially insoluble in water.

8. A coating composition according to claim 7 wherein the algicide is 5,5'-dichloro-2,2'-dihydroxy-diphenylmethane.

* * * * *